United States Patent Office 2,774,706
Patented Dec. 18, 1956

2,774,706

FUNGICIDAL COMPOSITION COMPRISING S-HYDROCARBYL ISOTHIOUREA SALTS AND METHOD OF APPLYING THE SAME

Johannes Thomas Hackmann and Willem Albertus Pel, Amsterdam, Netherlands, assignors to Shell Development Company, Emeryville, Calif., a corporation of Delaware No Drawing. Application September 16, 1953, Serial No. 380,608

Claims priority, application Germany September 20, 1952

9 Claims. (Cl. 167—22)

This invention relates to compositions suitable for combating fungi and to a method of combating fungi. More particularly, it relates to a method and to compositions for protecting plants from destruction by fungi.

The control of fungus diseases in agricultural areas and especially on trees and crops has received wide-spread attention over a long period. Fruit trees, for example, are sprayed at a number of times during a season for the purpose of combating diseases. Crops, likewise, must be protected against the injury caused by the attack of phytopathogenic organisms, especially where they are subject to prolonged humid conditions.

The substantial part of past investigations has been concerned with the use of inorganic agents for fungus control. While organic materials have received limited attention for this purpose, they are, in many instances, limited in their utility by their phytotoxic characteristics. Because of such properties, many organic materials may be used for the preservation of such materials as wood or marine piling but could not be used on growing plants or trees. It is possible to apply some of these organic substances to plants in sufficiently great dilution that their phytotoxic properties are repressed, but in most instances their fungicidal activity then is too low to be of utility. Also, many of the organic materials which have been investigated either fail to resist weathering or decompose under the conditions of use.

It is an object of the present invention to provide new fungicidal compositions which exhibit substantially no phytotoxicity when applied to foliage and crops in concentrations high enough to effectively combat fungi. It is another object of this invention to describe a new method for combating fungi. Other objects and advantages will become apparent from the following detailed description.

In accordance with the present invention, it has now been found that salts of S-hydrocarbyl isothioureas in which the hydrocarbyl substituent contains not more than 16 carbon atoms and acids of acid-forming elements of groups V to VI of the periodic table are particularly suitable foliage fungicides.

According to a preferred embodiment, salts of S-alkyl isothioureas in which the alkyl group contains not more than 16 carbon atoms and acids of acid-forming elements of groups V to VI of the periodic table are employed for combating fungi.

According to a specific embodiment, salts of S-alkyl isothioureas in which the alkyl group contains not more than 12 carbon atoms and alkylated aromatic sulfonic acids having at least 12 carbon atoms are utilized as foliage fungicides.

According to another specific embodiment, salts of S-alkyl isothioureas in which the alkyl group contains not more than 12 carbon atoms and tetrathiocyanodiammonochromic acid are utilized as foliage fungicides.

The most suitable S-hydrocarbyl isothioureas, the salts of which are utilized in the present invention, are the S-alkyl isothioureas and S-aralkyl isothioureas in which the S-substituent contains not more than 16 carbon atoms, preferably from about 6 to about 12 carbon atoms. Representative suitable S-hydrocarbyl isothioureas include: S-n-butyl isothiourea, S-amyl isothiourea, S-n-hexyl isothiourea, S-heptyl isothiourea, S-n-octyl isothiourea, S-2-ethylhexyl isothiourea, S-nonyl isothiourea, S-decyl isothiourea, S-undecyl isothiourea, S-dodecyl isothiourea, S-tridecyl isothiourea, S-tetradecyl isothiourea, S-pentadecyl isothiourea, S-cetyl isothiourea, S-benzyl isothiourea, S-phenylethyl isothiourea, S-phenylpropyl isothiourea, S-phenylbutyl isothiourea, and the like. The foregoing compounds may be substituted on the nitrogen atoms, but are preferably unsubstituted.

The acids which are employed in the formation of the present salts are those of acid-forming elements of groups V to VI of the periodic table, such as nitrogen, phosphorus, arsenic, antimony, sulfur, selenium, tellurium, chromium, molybdenum, and tungsten. Representative suitable acids include inorganic acids such as nitric acid, phosphoric acid, phosphorus acid, pyrophosphoric acid, hypophosphoric acid, chromic acid, Reinecke acid (tetrathiocyanodiammonochromic acid), sulfuric acid, sulfurous acid, molybdic acid, selenic acid, selenous acid, tungstic acid, telluric acid, etc.; and organic acids, such as organic sulfonic acids, organic sulfinic acids, organic phosphonic acids, organic phosphonous acids, organic phosphinic acids, organic phosphinous acids, and the like. Of the organic acids, those having more than about 12 carbon atoms are preferred. The most suitable organic acids are the aromatic sulfonic acids having more than about 12 carbon atoms, for example, dodecyl benzene sulfonic acid, oil-soluble petroleum sulfonic acids, cetylbenzene sulfonic acid, cetylphenol sulfonic acid, octylbenzene sulfonic acid, nonylbenzene sulfonic acid, cetylnaphthalene sulfonic acid, octylnaphthalene sulfonic acid, and the like.

Suitable salts which can be used in accordance with the present invention include: S-octyl isothiourea phosphate; S-heptyl isothiourea phosphate; S-nonyl isothiourea phosphate; S-decyl isothiourea phosphate; S-cetyl isothiourea phosphate; S-benzyl isothiourea phosphate; S-octyl isothiourea nitrate; S-heptyl isothiourea nitrate; S-dodecyl isothiourea nitrate; S-benzyl isothiourea nitrate; S-heptyl isothiourea dodecylbenzene sulfonate; S-octyl isothiourea dodecylbenzene sulfonate; S-nonyl isothiourea dodecylbenzene sulfonate; S-cetyl isothiourea cetylbenzene sulfonate; S-decyl isothiourea cetylnaphthalene sulfonate; the S-heptyl isothiourea salt of Reinecke acid; the S-octyl isothiourea salt of Reinecke acid; the S-nonyl isothiourea salt of Reinecke acid; and the like. The most suitable salts are those which have only limited solubility in water and are, therefore, more resistant to washing off by rain. Such salts include the S-hydrocarbyl isothiourea salts of alkylated aromatic sulfonic acids, particularly alkylated benzene sulfonic acids, having more than 12 carbon atoms, which salts are particularly suitable for use in the present invention.

The free isothioureas from which the present salts are derived are, in general, too phytotoxic and too unstable to be useful as foliage fungicides.

The present salts need not be employed in a pure condition. Inactive admixtures which have been formed in the commercial preparation thereof can be present. Mixtures of active compounds as can be readily prepared from commercial products are also suitable.

The salts of the present invention can be used alone or in combination with other fungicidal, viricidal, insecticidal or acaricidal materials, the action of which may be either internal or external, with plant nutritives, with plant hormones, and the like. Wetting agents and, if necessary or desirable, stickers can be present. Any conventional wetting agent, for example, alkyl sulfate salts, alkyl aryl sulfonate salts, sulfosuccinate salts, ethers from polyethylene glycols and alkylated phenols and the like can be employed. If the toxic agents are employed in the form of emulsions or suspensions, for example, in water, solvents such as oils, emulsifiers, emulsion stabilizers, and the like can be added. Materials which suppress the phytotoxic action of the fungicides, thereby making it possible to utilize unusually high dosages of the fungicidal material, can also be present. For example, glucose is known to protect tomato plants against damage by certain substances having a phytotoxic effect when in concentrated form, such as urea.

The present salts are preferably applied to plants by means of spraying. Spraying of the plants to be treated is preferably performed with aqueous solutions of suspensions of the active agents. Aqueous solutions or suspensions containing from about 0.01 to about 1% by weight, and preferably from about 0.05 to about 0.5% by weight, of the active agent are particularly suitable. The spray liquid is generally applied at a rate of from about 75 to about 150 gallons per acre. If spraying is effected with much smaller quantities of liquid ("low volume spraying"), higher concentrations of the active agents should be employed. If desired, a minor amount, of the order of from about 0.01 to about 0.05% by weight, of a wetting agent can be added to aid in forming a suspension of the salt in the aqueous medium. Any of the conventional wetting agents, such as those mentioned above, can be employed. Particularly suitable wetting agents are the sodium salt of a mixture of secondary heptadecyl sulfates, sold commercially under the name of "Teepol" and polyethylene glycol ethers of alkyl phenols sold under the trade name of "Triton X–100" and "Triton X–155." Preferably, concentrate compositions comprising the active salt of the present invention and a suitable wetting agent are prepared, and the concentrate is then dispersed in water just prior to use.

The plants can also be treated by immersing them together with their root systems in an aqueous solution or suspension of the active salt. This procedure is advisable chiefly in the treatment of cucurbitaceae. When employing this procedure, concentrations of the active salt of as low as 0.005% can be used, the preferred concentration being from about 0.01 to about 0.05% by weight. The period of treatment should be a few hours, for example, from about 2 to about 5 hours.

The present salts can also be applied to plants in the form of dusts, utilizing as the inert vehicle such materials as talc, kaolin and other clays, bentonite, and the like.

The invention is illustrated by the following examples which are not to be considered as limiting the specification and claims in any manner:

*Example I*

Cucumber plants having a height of about 10 cms. were placed with their roots, for four hours, in various concentrations of solutions of the acetate, the hydrochloride, the nitrate and the phosphate of S-benzyl isothiourea. The treated plants were then replanted. After a few days, the phytotoxic effect of the compounds being tested was determined. It was found that the acetate and the hydrochloride of S-benzyl isothiourea, even when employed in concentrations of as low as 0.05%, caused damage to the plants, and that the plants were completely killed when using concentrations of 0.1%. On the other hand, the plants treated with the nitrate and the phosphate salts of S-benzyl isothiourea showed no damage at concentrations of 0.3% and even as high as 0.5%.

*Example II*

The fungicidal effectiveness, measured as "degree of suppression," of 0.1% aqueous solutions of the phosphates of S-n-heptyl isothiourea, S-n-octyl isothiourea and S-n-decyl isothiourea against Phytophthora on potatoes was determined by spraying two-months old infected plants with the aqueous solutions. The degree of suppression of the disease was 58%, 56% and 58%, respectively. For purposes of comparison, the degree of suppression of a 0.1% aqueous solution of copper oxychloride, a known fungicide, was determined and found to be 46%.

The degree of suppression was determined by the following method:

Test plants were sprayed with an aqueous solution of the active salt until the liquid dropped from the leaves. After the spray liquid dried, usually after about two days, the plants were exposed to contamination with the fungus. Depending on the kind of test plant and of the fungus, contamination was effected either by inoculation of the plant or by placing the plant in contaminated surroundings, for example, in a greenhouse in which plants affected by the fungus were present. Conditions were chosen such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the fungus has succeeded. Hereinafter, this quantity, expressed in percent, will be termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an accuracy of about 5%. This accuracy is sufficient since, in general, results obtained in biological tests are only reproducible within rather wide limits.

*Example III*

The roots of young cucumber plants were dipped in a 0.005% aqueous solution of S-heptyl isothiourea phosphate for about 4 hours. Four days later, the plants were infected with a suspension of Fusarium spores. The percent control, that is, the percentage of plants living after 3 weeks, was 80%.

For purposes of comparison, a 0.005% aqueous solution of the HBr salt of S-heptyl isothiourea was tested in the same manner. The percent control was only 40%.

We claim as our invention:

1. The method of protecting plants from destruction by fungi which comprises treating the plants with a fungicidal toxic amount of S-n-octyl isothiourea phosphate.

2. The method of protecting plants from destruction by fungi which comprises treating the plants with a fungicidal toxic amount of S-n-decyl isothiourea phosphate.

3. The method of protecting plants from destruction by fungi which comprises treating the plants with a fungicidal toxic amount of S-benzyl isothiourea phosphate.

4. The method of protecting plants from destruction by fungi which comprises treating the plants with a fungicidal toxic amount of isothiourea salt, the isothiourea portion of said salt being chosen from the group consisting of S-alkyl isothiourea wherein said alkyl radical contains between 4 and 16 carbon atoms and S-phenylalkyl isothiourea wherein said phenyl alkyl radical contains between 1 and 16 carbon atoms, and the acid portion of said salt being an acid of an element selected from the group consisting of nitrogen, phosphorus, sulfur, selenium, tellurium, chromium, molybdenum, and tungsten.

5. A fungicidal composition comprising an aqueous medium, a surface-active wetting agent and a fungicidal toxic amount of S-n-octyl isothiourea phosphate.

6. A fungicidal composition comprising an aqueous medium, a surface-active wetting agent and a fungicidal toxic amount of S-n-decyl isothiourea phosphate.

7. A fungicidal composition comprising an aqueous medium, a surface-active wetting agent and a fungicidal toxic amount of S-benzyl isothiourea phosphate.

8. A fungicidal composition comprising an aqueous medium, a surface-active wetting agent and a fungicidal toxic amount of isothiourea salt, the isothiourea portion of said salt being chosen from the group consisting of S-alkyl isothiourea wherein said alkyl radical contains between 4 and 16 carbon atoms and S-phenylalkyl isothiourea wherein said phenyl alkyl radical contains between 1 and 16 carbon atoms, and the acid portion of said salt being an acid of an element selected from the group consisting of nitrogen, phosphorus, sulfur, selenium, tellurium, chromium, molybdenum, and tungsten.

9. A fungicidal composition comprising an aqueous medium, a surface-active wetting agent and a fungicidal toxic amount of S-alkyl isothiourea phosphate, said alkyl radical having between 4 and 16 carbon atoms.

No references cited.